(12) United States Patent
Turner (10) Patent No.: US 11,864,609 B2
(45) Date of Patent: Jan. 9, 2024

(54) THERMALLY-INSULATED GARMENT

(71) Applicant: NIKE, Inc., Beaverton, OR (US)

(72) Inventor: David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 534 days.

(21) Appl. No.: 15/766,073

(22) PCT Filed: Sep. 30, 2016

(86) PCT No.: PCT/US2016/054811
§ 371 (c)(1),
(2) Date: Apr. 5, 2018

(87) PCT Pub. No.: WO2017/062281
PCT Pub. Date: Apr. 13, 2017

(65) Prior Publication Data
US 2018/0289090 A1    Oct. 11, 2018

Related U.S. Application Data

(60) Provisional application No. 62/237,230, filed on Oct. 5, 2015.

(51) Int. Cl.
*A41D 31/06* (2019.01)
*B32B 7/05* (2019.01)
(Continued)

(52) U.S. Cl.
CPC .............. *A41D 31/065* (2019.02); *B32B 3/08* (2013.01); *B32B 5/02* (2013.01); *B32B 5/06* (2013.01);
(Continued)

(58) Field of Classification Search
CPC .......... A41D 31/065; B32B 7/05; B32B 3/08; B32B 5/02; B32B 5/06; B32B 5/26;
(Continued)

(56) References Cited

U.S. PATENT DOCUMENTS 2,180,373 A    11/1939   Sibley et al.
3,577,305 A    5/1971    Hines et al.
(Continued)

FOREIGN PATENT DOCUMENTS

CN      204444298 U      7/2015
GB      2228866          9/1990
WO      2017062281 A1    4/2017

OTHER PUBLICATIONS

Celanese Acetate "Complete Textile Glossary" 2001, entry for "Staple" (Year: 2001).*
(Continued)

*Primary Examiner* — Alicia J Weydemeyer
*Assistant Examiner* — Laura B Figg
(74) *Attorney, Agent, or Firm* — SHOOK, HARDY & BACON L.L.P.

(57) ABSTRACT

The present invention is directed to thermally-insulated garments and methods of forming the same. The garments in accordance with aspects herein have one or more chambers filled with a thermally-insulating fill material. The thermally-insulating fill material includes a plurality of crimped thermally-reflective polymer strands. Each strand in the plurality of crimped thermally-reflective polymer strands is crimped to provide an increased reflective surface area for heat deflection/reflection, breathability, and movability of the thermally-insulated garment.

27 Claims, 3 Drawing Sheets

(51) Int. Cl.
*B32B 5/06* (2006.01)
*B32B 5/26* (2006.01)
*B32B 3/08* (2006.01)
*B32B 7/14* (2006.01)
*B32B 5/02* (2006.01)
*B32B 7/12* (2006.01)

(52) U.S. Cl.
CPC .............. *B32B 5/26* (2013.01); *B32B 7/05* (2019.01); *B32B 7/12* (2013.01); *B32B 7/14* (2013.01); *B32B 2262/0284* (2013.01); *B32B 2262/062* (2013.01); *B32B 2262/065* (2013.01); *B32B 2262/08* (2013.01); *B32B 2307/304* (2013.01); *B32B 2437/00* (2013.01)

(58) Field of Classification Search
CPC .... B32B 7/08; B32B 7/12; B32B 7/14; B32B 2262/0284; B32B 2262/062; B32B 2262/065; B32B 2262/08; B32B 2307/304; B32B 2437/00
See application file for complete search history.

(56) References Cited

U.S. PATENT DOCUMENTS

| | | | |
|---|---|---|---|
| 3,922,455 A * | 11/1975 | Brumlik | A44B 18/0015 |
| | | | 24/449 |
| 4,211,261 A * | 7/1980 | Mehta | A41D 31/08 |
| | | | 2/81 |
| 4,278,721 A | 7/1981 | Hudgin | |
| 4,304,817 A | 12/1981 | Frankosky | |
| 4,395,455 A | 7/1983 | Frankosky | |
| 4,460,645 A * | 7/1984 | Jones | A41D 31/04 |
| | | | 428/407 |
| 4,569,874 A | 2/1986 | Kuznetz | |
| 4,571,744 A | 2/1986 | Lesh | |
| 4,777,086 A | 10/1988 | Madden et al. | |
| 4,933,129 A * | 6/1990 | Huykman | D04H 1/4234 |
| | | | 264/116 |
| 5,737,774 A | 4/1998 | Petty-saphon et al. | |
| 5,830,548 A | 11/1998 | Andersen et al. | |
| 6,341,384 B1 | 1/2002 | Hayes | |
| 6,599,850 B1 | 7/2003 | Heifetz | |
| 6,824,819 B2 | 11/2004 | Vogt et al. | |
| 7,051,459 B1 | 5/2006 | Wigutow | |
| 7,140,048 B2 | 11/2006 | Wallerstein | |
| 8,424,119 B2 | 4/2013 | Blackford | |
| 2006/0135019 A1 | 6/2006 | Russell et al. | |
| 2010/0003877 A1 | 1/2010 | Fan et al. | |
| 2010/0218301 A1 | 9/2010 | Messiou | |
| 2013/0276201 A1 * | 10/2013 | Pezzimenti | A41D 13/002 |
| | | | 2/69 |
| 2014/0250575 A1 | 9/2014 | Man | |
| 2015/0181963 A1 | 7/2015 | Kiederle et al. | |
| 2016/0235147 A1 | 8/2016 | Pezzimenti et al. | |

OTHER PUBLICATIONS

International Search Report and Written Opinion dated Dec. 14, 2016 in International Patent Application No. PCT/US2016/054811, 11 pages.

International Preliminary Report on Patentability dated Apr. 19, 2018 in International Patent Application No. PCT/US2016/054811, 8 pages.

Corrugated and Flat Fiberglass Sheet Panels. Plexiglass Sheets, Fiberglass, UHMW, Polycarbonate & Engineering plastics, plasticgenius.com, Mar. 25, 2009. http://www.plasticgenius.com/2009/03/corrugated-and-flat-fibgerlass-sheet.html.

Faux Fur Electric Shag Purple. Fabric, fabric.com, Item No. 0266751, Accessed: Jun. 2015. https://www.fabric.com/buy/0266751/faux-fur-electric-shag-purple.

Re: Mylar Inside Clothing. National Steam, disc.yourwebapps.com, Aug. 8, 2009. http://disc.yourwebapps.com/discussion.cgi?disc=192635;article=31221;title=NATIONAL%20STEAM.

Mylar Rescue Blanket. Delta Gear, deltagearinc.com, Item #51100, 2014. https://www.deltagearinc.com/insulation/blankets/mylar-rescue-blanket.php.

Abstract Reflection in metalized Mylar film T-shirts. Zazzle Apparel, zazzle.com, Accessed: Jun. 2015. http://www.zazzle.com/abstract_reflection_in_metalized_mylar_film_tshirt-235234725844768296.

Office Action received for European Patent Application No. 16781951.5, dated Mar. 19, 2020, 3 pages.

Intention to Grant received for European Patent Application No. 16781951.5, dated Dec. 9, 2021, 7 pages.

\* cited by examiner

THERMALLY-INSULATED GARMENT

CROSS-REFERENCE TO RELATED APPLICATIONS

This application entitled "Thermally-Insulated Garment," is a National Phase U.S. Nonprovisional Application claiming priority to PCT Application No. PCT/US2016/054811, entitled "Thermally-Insulated Garment," filed on Sep. 30, 2016, which in turn claims priority, under 35 U.S.C. 371, to U.S. Provisional Application No. 62/237,230, entitled "Thermally-Insulated Garment," filed on Oct. 5, 2015. The entirety of the aforementioned applications are incorporated by reference herein.

FIELD OF THE INVENTION

The present invention relates to cold-weather insulation garments. More particularly, the present invention relates to breathable, insulating cold-weather garments.

BACKGROUND OF THE INVENTION

Thermally-insulated garments are typically filled with either, synthetic thermally-insulating fibers and/or synthetic fill materials, and/or natural fill materials. Sometimes, particularly when a high level of insulation is desired, garments can feel bulky and uncomfortable, especially when worn during physical activity. Thinner versions of thermally-insulated garments can employ heat-reflective materials that reflect heat generated by the wearer's body back to the wearer. However, the heat-reflective materials employed in these garments are in the form of films, which can impede breathability, flexibility, and can be undesirably noisy.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects described herein are directed toward thermally-insulated garments. In particular, thermally-insulated garments in accordance with aspects of the present disclosure employ a thermally-insulating material comprising a plurality of discrete reflective strands. Each of the plurality of discrete reflective strands may be "crimped," for example, into a zig-zag configuration. The crimping on each of the plurality of discrete reflective strands increases the surface area for heat reflectivity and further facilitates the multi-directional heat-reflective properties of the thermally-reflective strands. Further, having discrete strands, as opposed to a film, can facilitate movability and breathability of the thermally-insulated garment.

A cold-weather garment in accordance with aspects of the present disclosure may be especially important to a wearer undergoing physical labor or aerobic activity, such as running, biking, hiking, and the like. A human's normal physiological response to aerobic activity is to cool down the body by releasing moisture from the body in the form of perspiration. This physiological response can still occur in cold environments, particularly when the person is wearing heat-insulating garments. Therefore, one of the objects of aspects described herein is to provide a cold-weather insulating garment that may protect a wearer from external environmental conditions while still being breathable, lightweight, and allowing for moisture from perspiration to escape into the outer environment.

Cold-weather garments in accordance with aspects of the present disclosure may be constructed using fabrics treated with down-proofing chemical treatments, and/or water repellants that may also act as down-proofing treatments, such chemical treatments are referred to as DWR (durable water repellant). For example, fabrics that may particularly benefit from DWR treatment for down-proofing are light fabrics (89 g/m$^2$-30 g/m$^2$), and ultra-light fabrics (29 g/m$^2$ or lighter). Down can have sharp shafts that can poke holes through light-weight fabrics, making them more susceptible to tearing or down loss over time. Other types of fill material, such as polyester fibers, may lack the sharp shafts of down but are still challenging to contain within a light-weight textile. Heavier fabrics, such as fabrics with weights in the range of 90 g/m$^2$-149 g/m$^2$, or even 150 g/m$^2$-250 g/m$^2$ or higher may be inherently more resistant to down and may or may not need a down-proofing treatment depending on the specific type of fabric/textile. Lighter-weight fabrics may be more desirable in the manufacture of insulation garments in order to keep the garments reasonably light-weight, especially in the manufacture of athletic and/or high aerobic activity-insulating garments.

The insulating garment, in accordance with aspects of the present disclosure, may be manufactured from a light-weight fabric and may comprise a number of chambers filled with thermal-insulating materials, such as synthetic fibers or natural fibers such as down, cotton, hemp, silk, and the like. Additionally, the thermal-insulating materials may comprise a plurality of crimped thermally-reflective strands. In a different aspect, the chambers may be filled with only the plurality of crimped thermally-reflective strands. In other words, the thermal-insulating materials in accordance with aspects of the present disclosure may comprise, for instance, between a 5 to a 100 percent content of crimped thermally-reflective strands. The thermally-reflective strands in accordance with aspects of the present disclosure may comprise, by way of non-limiting example only, Mylar® or other similar thermally-reflective polymer materials. As described above, the crimping of the thermally-reflective strands offers an increased surface area for improved heat deflection/reflection, while also offering heat deflection/reflection in multiple-directions. Additionally, the discrete nature of the thermally-reflective strands (i.e., having individual mobility within the chamber) promotes movability, breathability, and flexibility of the garment.

The chambers in the garments in accordance with exemplary aspects of the present disclosure may be separated by seams. Seams separating the chambers may be spaced at varying intervals and may have any orientation and/or shape. The seams may be formed, for example, by actively affixing/joining at least two layers of fabric together with a suitable adhesive material, by stitching two layers of fabric together, or using both the adhesive tape and stitching methods. In the case of certain fabrics, a tape may not be needed if the fabrics can be bonded without the use of tape. In another example, the chambers and/or seams may be generated through a knitting or weaving process. For instance, a knitting or weaving machine may be programmed to integrally knit or weave the layers of fabric, the chambers, and/or the seams. Any and all aspects, and any variation thereof, are contemplated as being within the scope herein.

In one example in accordance with aspects of the present disclosure, the garment may be a standalone garment. To this end, the garment may be in the form of a vest covering a person's body core area, a jacket with sleeves, a total body suit, pants, shorts, and the like.

Alternatively, the garment in accordance with aspects of the present disclosure may be used as a removable inner-insulating layer having an outer shell which may or may not be weatherproof. This inner insulating layer may also be worn as a standalone garment when detached from the outer shell. Like in the previous example, the removable inner-insulating layer may be presented as a vest, a jacket, a body suit, pants, shorts, and the like, depending on the type of garment and protection desired. For example, if the outer shell is a long-sleeved jacket, the insulating layer may be presented as a vest, a jacket, or a jacket with removable sleeves to convert into a vest, depending on the amount of insulation desired. The insulating layer may be fastened to the outer shell by a zipper mechanism, buttons, hook-and-loop fasteners, any other fastening mechanism available in the market, and/or any combination of fastening mechanisms available.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWING

The present invention is described in detail herein with reference to the attached drawing figures, wherein.

DETAILED DESCRIPTION OF THE INVENTION

Figure 1A:
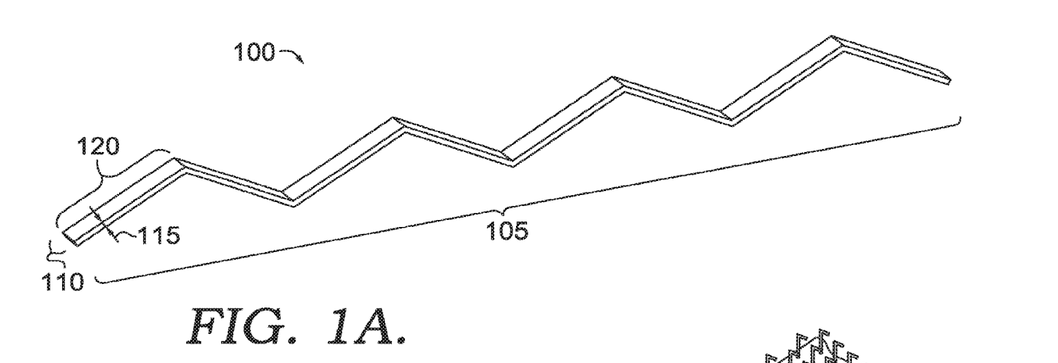
FIG. 1A-1C depict exemplary crimped thermally-reflective strand configurations in accordance with aspects of the present disclosure.

Aspects hereof provide for thermally-insulated garments and methods of making the same. FIG. 1A is a depiction of a single thermally-reflective strand 100 in accordance with aspects of the present disclosure. The thermally-reflective strand 100 may be formed from a polymer material or a metallic material suitable for thermal reflection. For example, the polymer materials used may include polyesters, polypropylenes, polyurethanes, nylon, and the like, in the form of films or resins metallized with aluminum, gold, copper, silver, tin, nickel, chromium, or any other metal deemed suitable for use in accordance with aspects of the present disclosure. One of such suitable polyesters may, for example, be polyethylene terephthalate (PET), more particularly biaxially-oriented polyethylene terephthalate (Bo-PET). Polyethylene terephthalate is desirable in applications in accordance to the present disclosure due to its high tensile strength, physical and chemical stability, reflectivity, transparency, electrical insulation and its properties as a gas and aroma barrier.

According to aspects of the present disclosure, the thermally-reflective strands 100 may be manufactured by forming a film from a suitable polymer material resin, coating one or both film surfaces with a desired metal compound by for example, plating techniques. Alternatively, a desired metal may be deposited onto to one or both film surfaces by using techniques such as vapor deposition, where the metal is heated and evaporated under vacuum conditions, and is consecutively allowed to condense on one or both surfaces of the polymer film, with the polymer film being maintained at a lower temperature than the metal vapor. In a different example, spraying processes may be employed to metallize the polymer film by spraying a metal powder and at least a binder onto one or both surfaces of the polymer film.

The polymer film may be crimped prior to or after metallization by heat setting, pressure molding, stretching, or any other suitable crimping method available in the art. For heat setting, the polymer film may be heated to above the glass transition temperature of the polymer material but below the melting point of the polymer material, setting the polymer film into a desired configuration, for example, on a molding surface, and then cooling the polymer film back to below the glass transition temperature of the polymer material to set the film into the desired configuration. For pressure molding, the polymer film may be placed into a mold, pressed into a desired crimped configuration, and then released from the mold. The mold for pressure molding may alternatively be a heated mold to expedite the crimping process. For stretching, the polymer film may be stretched up to a deformation point but below its breaking point, and then released, thereby forming stretch marks on the polymer film. Although the polymer film has been described above as being metallized prior to crimping, the polymer film may also be metallized after crimping.

The polymer film may be converted into the thermally-reflective strands 100 by, for example, die cutting, laser cutting, water jet cutting, scissor cutting, knife cutting, or any other suitable cutting method. Alternatively, the thermally-reflective strands 100 may be formed by extrusion. For example, the polymer material may be melted and extruded into a desired strand shape, having a desired thickness and width. The extruded strand(s) may be metallized according to any of the above disclosed methods as the strands are being extruded, or the strand(s) may be extruded first and then metallized in a separate process.

Figure 1B:
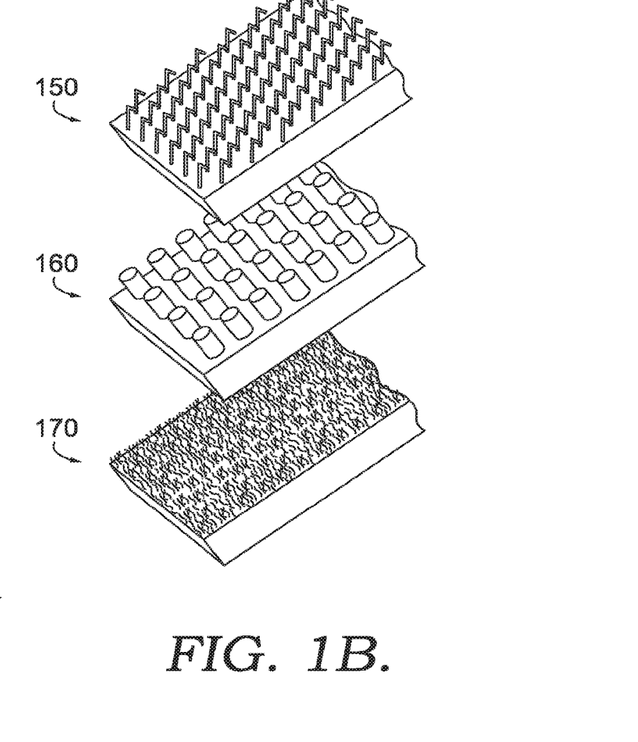
Figure 1C:
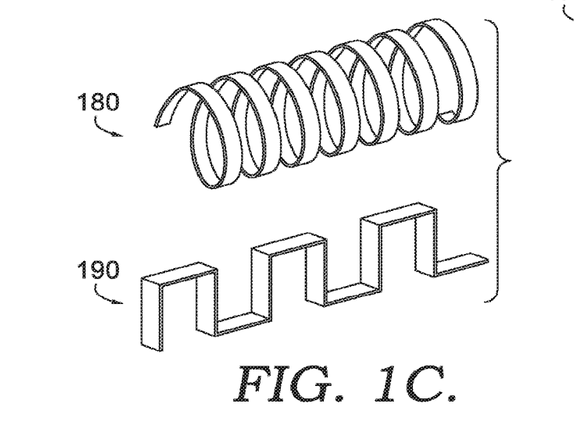

As in the case of the polymer film, the extruded metallized strand(s) may be crimped prior to or after metallization. In addition to the crimping methods discussed above, the extruded metallized strand(s) may be crimped by texturing processes such as false twisting, air jet texturing, edge crimp texturing, stuffer box texturing, knit-deknit texturing, gear crimping, and the like, according to the type of crimp configuration desired. For example, different crimp configurations may comprise curling, such as 180 in FIG. 1C, or another example of a crimp configuration may be in the form of a rectangular shape, such as 190 in FIG. 1C.

Additionally, each of the thermally-reflective strands 100 may be textured to add a frictional surface to the thermally-reflective strands 100 so that they are able to grip onto each other or onto additional thermally-insulating fill materials that may be employed in the construction of garments in accordance with the present invention. The textured surfaces may therefore further aid in the prevention of the thermally-reflective strands 100 from slipping through the garment seams, or through the textile itself, or from settling within an individual chamber. The thermally-reflective strands 100 may, for example, be textured by loosely adding stitches to one or both surfaces of the thermally-reflective strands 100, as shown in 150 in FIG. 1B, the thermally-reflective strands 100 may be stamped to form protrusions, as shown in 160 in FIG. 1B, or the thermally-reflective strands 100 may be flocked, as shown in 170 in FIG. 1B. Other potential texturing methods known in the art may be employed, such as, for example, thermal molding, thermal setting, and the like (not shown), that would achieve similar results as the ones shown in FIG. 1B. Moreover, although the texturing is shown to be uniform, in FIG. 1B, one of ordinary skill in the art should recognize that the texturing may potentially be random, or in a pattern forming different shapes such as letters, logos, designs, etc.

An exemplary metallized polymer material that may be used in accordance with aspects of the present disclosure includes Mylar®. Each thermally-reflective strand 100 as shown in FIG. 1A, may have a predetermined length 105, width 110, and thickness 115. The predetermined length 105 may range between, for example, 0.5 cm and 100 cm, 0.5 cm and 50 cm, 0.5 cm and 20 cm, and/or between 0.5 cm and 10 cm, although lengths above and below these ranges are contemplated herein. The predetermined width 110 may range between, for instance, 0.01 cm and 1 cm, 0.1 cm and 0.75 cm, and/or between 0.5 cm and 0.7 cm, although widths above and below these values are contemplated herein. The predetermined thickness 115 may range between, for example, 0.0001 cm and 0.5 cm, 0.001 cm and 0.4 cm, and/or between 0.01 cm and 0.3 cm, although thicknesses above and below these values are contemplated herein.

In accordance with aspects of the present disclosure, the thermally-reflective strands 100 employed may be of uniform size and/or shape, or in the alternative, the thermally-reflective strands 100 employed may each have a random size and/or shape. As further shown in FIG. 1A, each thermally-reflective strand 100 may be crimped in, for example, a zig-zag pattern with each crimp section of the thermally-reflective strand 100 having a length 120. Although the example shown in FIG. 1A is a zig-zag pattern, other patterns are also possible, where such patterns effectively increase the surface area of the thermally-reflective strand 100, as discussed above, and as shown in FIG. 1C. As discussed above, each of the thermally-reflective strands 100 may be formed by applying a crimping process to a sheet or film of a thermally-reflective metallized polymer material and by subsequently cutting the sheet or film into the individual thermally-reflective strands 100. Further, in addition to the crimping methods discussed above, the metallized polymer sheet or film may be crimped via, for example, folding the sheet or film, accordion style and applying mechanical pressure to the sheet such that the crimps are formed. The mechanical pressure may be such that the crimps are permanently maintained even when the formed thermally-reflective strands 100 are in a resting state. Any and all aspects, and any variation thereof, are contemplated herein.

The crimping on each thermally-reflective strand 100 is configured to increase the surface area for reflecting heat back to the wearer. Additionally, the crimping on each thermally-reflective strand 100 allows the thermally-reflective strands 100 to reflect heat back to the wearer in multiple directions, thereby creating an overlap of thermal reflectivity when multiple thermally-reflective strands 100 are employed as or as part of the thermally-insulating fill material. In other words, the total area of thermal reflection covered by the crimped thermally-reflective strands 100 is more uniform than the total area of heat reflection that would be covered by multiple uncrimped thermally-reflective strands. This is because when uncrimped, the thermally-reflective strands would offer heat reflectivity in a single direction, thereby creating thermal reflection gaps where the uncrimped thermally-reflective strands are not present. Moreover, the crimped configuration of the thermally-reflective strands 100 may reduce settling of the thermally-reflective strands 100 and may further reduce the noise that is typically associated with sheets of thermally-reflective material when used in garments. As well, the crimping may prevent the thermally-reflective strands 100 from traveling between seams and through seams.

As described above, there are many different methods for forming the crimped thermally-reflective strands 100. Different crimping methods may offer different degrees of crimping. The degree of crimping of the thermally-reflective strands 100, as discussed above, is directly correlated to the surface area of the thermally-reflective strands 100 available for thermal reflectivity. In other words, the greater the degree of crimping, the larger the surface area of the thermally-reflective strand 100. The level of crimp in each thermally-reflective strand 100 may for example be quantified as, for example, as a percent length loss going from an uncrimped length to a crimped length. More specifically, the crimped length may be divided by the uncrimped length and then, the first result may be multiplied by 100 to get a second result. Finally, the second result may be subtracted from 100 to arrive at the length percent loss of the uncrimped thermally-reflective strand 100. In other words, the length percent loss of the uncrimped thermally-reflective strand 100 is a measure of how much shorter the thermally-reflective strand 100 became as a result of being crimped. As an illustrative example, if the length of an uncrimped thermally-reflective strand 100 is 10 cm and the length of the crimped thermally-reflective strand is 5 cm, the length percent loss would be 50%, which means that the uncrimped thermally-reflective strand 100 became 50% shorter as a result of crimping. However, the total surface area remains the same in the crimped and uncrimped thermally-reflective strand 100. In other words, the crimped thermally-reflective strands 100 are shorter by a particular length percent loss, and therefore, take up less space than would uncrimped thermally-reflective strands. Therefore, depending on the amount of thermal insulation desired for the particular garment, the garments in accordance with the present disclosure may be made less bulky, or in the alternative, the content of the crimped thermally-reflective strands 100 may be increased for more thermal insulation without increasing the bulkiness of the garment. In particular, when compared to when no thermally-reflective materials or uncrimped thermally-reflective strands would be used. Exemplary length percent loss contemplated herein may comprise 80% length percent loss, 70% length percent loss, 60% length percent loss, 50% length percent loss, 40% length percent loss, and/or 30% length percent loss, although values above and below these are contemplated as being within the scope herein.

In exemplary aspects, the parameters associated with the thermally-reflective strands 100 (e.g., length, width, thickness, number, and/or degree of crimping) may be adjusted to provide a greater or lesser amount of heat reflectivity. For instance, a greater amount of crimping of the thermally-reflective strands 100 may increase the surface area for reflectivity, while a lesser amount of crimping of the thermally-reflective strands 100 may decrease the surface area for reflectivity. Furthermore, the parameters associated with the thermally-reflective strands 100 may be adjusted depending upon which area of a garment the thermally-reflective strands 100 will be located at. As an example, for those portions of the garment where a higher degree of insulation is needed, the number of thermally-reflective strands 100 and/or the amount of crimping of the thermally-reflective strands 100 may be increased to provide a greater degree of heat reflectivity. Conversely, if a high degree of insulation is not needed in a certain area of the garment, the number of thermally-reflective strands 100 and/or the amount of crimping associated with the thermally-reflective strands 100 may be reduced. Any and all aspects, and any variation thereof, are contemplated as being within the scope herein.

Figure 2:
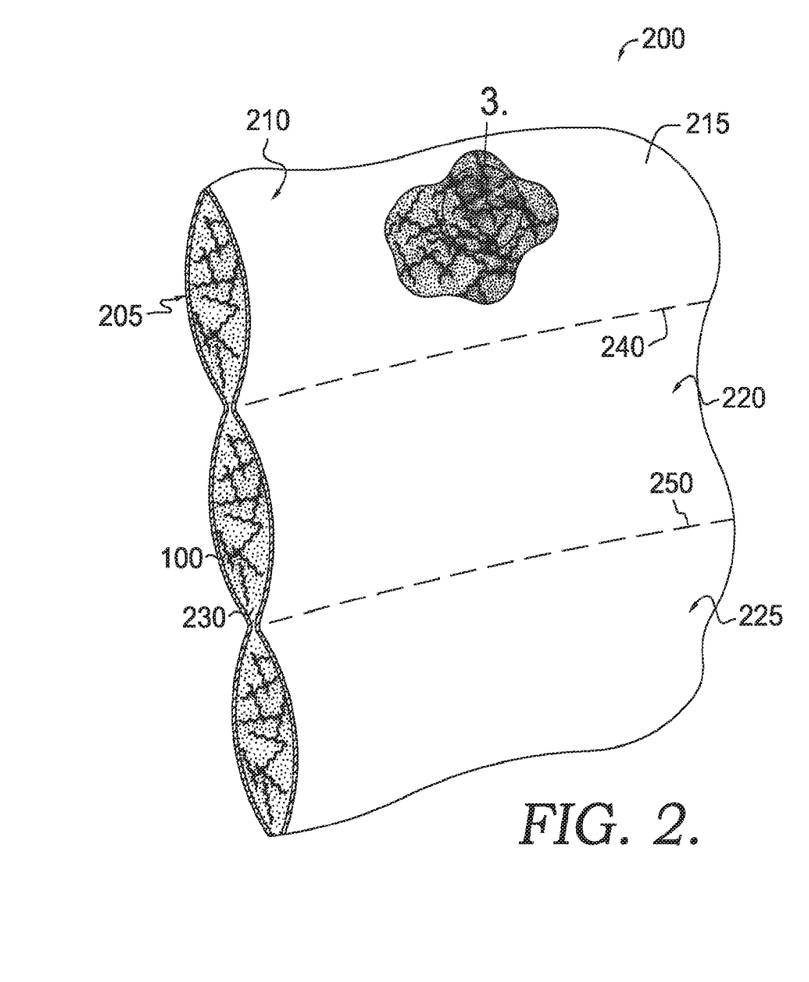
FIG. 2 depicts a section of an exemplary garment construction with a cross-sectional view and a side view in accordance with aspects of the present disclosure.

As seen in FIG. 2, a plurality of thermally-reflective strands 100 may be used as the fill material for a garment. In some aspects, the plurality of thermally-reflective strands 100 may be used in combination with synthetic or natural thermally-insulating fill fibers (e.g., down), which together may comprise a thermally-insulating fill material 230. FIG. 2 displays a cut-away-section 200 of a garment constructed in accordance with aspects of the present disclosure.

In exemplary aspects, the garment in accordance with aspects of the present disclosure may be formed from an outer layer 205 and an inner layer 210. Each of the outer layer 205 and the inner layer 210 may comprise an outer face and an inner face, wherein the outer face of the outer layer 205, in this particular configuration, is the layer exposed to the elements of an external environment (or to, for example, a layer over the garment), while the outer face of the inner layer 210 may be in contact with a wearer's body when the garment is worn (or, for example, may be in contact with a base layer). The inner faces of both the outer layer 205 and the inner layer 210 may be in contact with the thermally-insulating fill material 230 used in accordance with aspects of the present disclosure, wherein the thermally-insulating fill material 230 is sandwiched in between the outer layer 205 and the inner layer 210.

The garment may be made from conventional synthetic or natural fabrics. The fabrics may be water-repellent and fill-proof, or alternatively such as in the case of light fabrics, they may need to be treated with waterproofing and/or down-proofing chemicals such as, for example, the chemical treatment referred to as DWR (durable water repellent).

The garment may be constructed by cutting out separate panels for the inner layer 210 and the outer layer 205 for each section of the garment, from suitable textiles or fabrics (not shown). As shown in FIG. 2, a plurality of chambers 215, 220, and 225 may be formed from the inner layer 210 and the outer layer 205 by affixing the inner layer 210 to the outer layer 205 by way of one or more seams 240, 250, located at predetermined locations on the garment. In the cut-away-section 200 of FIG. 2, the seams 240 and 250 facilitate the separation of the chambers 215, 220, and 225. Seams 240 and 250 may be formed by, for instance, stitching, thermal bonding, adhesive bonding, or integrally knitting or weaving the seams 240 and 250. For example, an adhesive tape suitable for the particular type of fabric or textile may be placed on the inner face of one of the inner layer 210 or the outer layer 205 at predetermined locations of the inner layer 210 or the outer layer 205 to form the chambers 215, 220 and 225 with the desired shape. Once the adhesive tape is set in place, the inner face of the inner layer 210 or the outer layer may 205 be aligned on top of the inner layer 210 or the outer layer 205 comprising the adhesive tape. Then, the two layers 210/205 may be pressed together with sufficient pressure and/or thermal energy, to activate the adhesive tape to create a bond(s) between the two layers 210/205. If the tape requires thermal energy for activation, the adhesive tape may be activated by heat, or ultrasonic energy, or any other source of thermal energy. Once the layers 210/205 are affixed to each other, the chambers 215, 220, and 225, separated by the seams 240 and 250 are formed. The seams 240 and 250 may be generally horizontally oriented on the garment, generally vertically oriented on the garment, or may be oriented in any direction between a horizontal direction and a vertical direction. The one or more seams 240 and 250 may be straight, zig-zag, curvy, or any other desired configuration. The spacing between the one or more seams 240 and 250 may vary, as may the relative orientation of the seams 240 and 250 and/or the shape of the seams 240 and 250, enabling the chambers 215, 220, and 225 to be different shapes and/or sizes.

In another example, the garment may be formed through an engineered weaving and/or knitting process (e.g., programming a knitting or weaving machine to integrally knit the different panels, chambers, and/or seams). In this example, the panels 205/210 may be integrally knit or woven together at the seams 240 and 250, and the panels 205/210 may be maintained separate from each other to form the chambers 215, 220, and 225.

Figure 3:
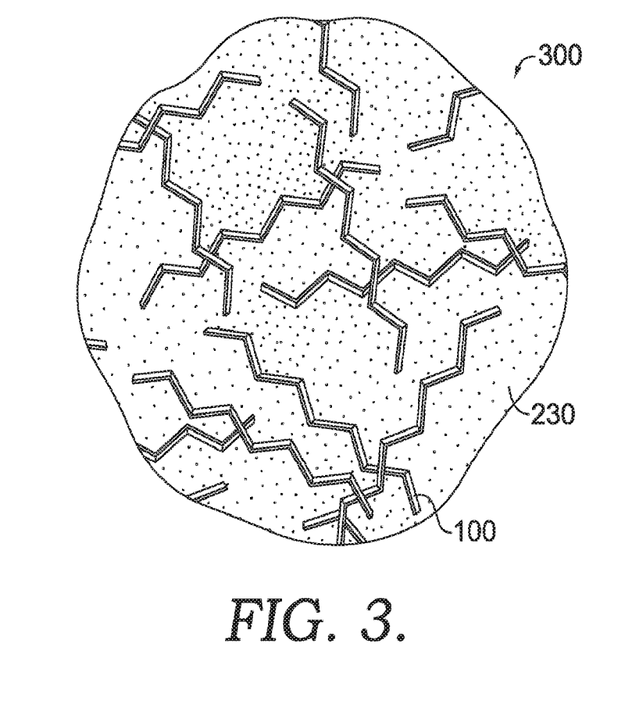
FIG. 3 depicts an enlarged view of section 3 marked in FIG. 2 in accordance with aspects of the present disclosure.

The chambers 215, 220, and 225 may then be filled with the thermally-insulating fill material 230, which further comprises the crimped thermally-reflective strands 100. As shown in FIG. 2, the crimped thermally-reflective strands 100 may be randomly integrated into the thermally-insulating fill material 230. This is shown in the enlarged view 300 of FIG. 3. Alternatively, in the case of woven or knit thermally-insulating fill materials that are usually formed into sheets, the thermally-reflective strands 100 may be purposefully integrated within the woven or knit thermally-insulating fill material by inter-weaving or inter-knitting the crimped thermally-reflective strands 100 into the sheet, or in the case of non-woven/knit thermally-insulating fill materials, the thermally-reflective strands 100 may be integrated by distributing the thermally-reflective strands 100 within layers of the non-woven/knit thermally-insulating fill material sheets, or by using any other method suitable for integrating the thermally-reflective strands 100 into the non-woven/knit thermally-insulating fill materials (not shown). Additionally, the thermally-insulating fill material 230 may be entirely composed of the plurality of thermally-reflective strands 100. As such, the thermally-insulating fill material 230 used for the garments in accordance with aspects of the present disclosure may comprise between 5 and 100 percent of the thermally-reflective strands 100. As seen in FIG. 3, the thermally-reflective strands 100 may provide an improved airflow to the garment because air can freely circulate around each individual thermally-reflective strand 100.

Depending on the size and/or shape of the chambers formed, the chambers 215, 220, and 225 may be filled with the thermally-insulating fill material 230 either manually or mechanically. Alternatively, if the thermally-insulating fill material used is in the form of a woven or knit sheet or in the form of a non-woven/knit sheet, the sheets may be cut into respective shapes of garment panels. The thermally-insulating fill material may then be secured (sandwiched) between garment layers (e.g., the outer layer 205 and the inner layer 210) by stitching the garment layers and the thermally-insulating fill materials together.

Figure 4:
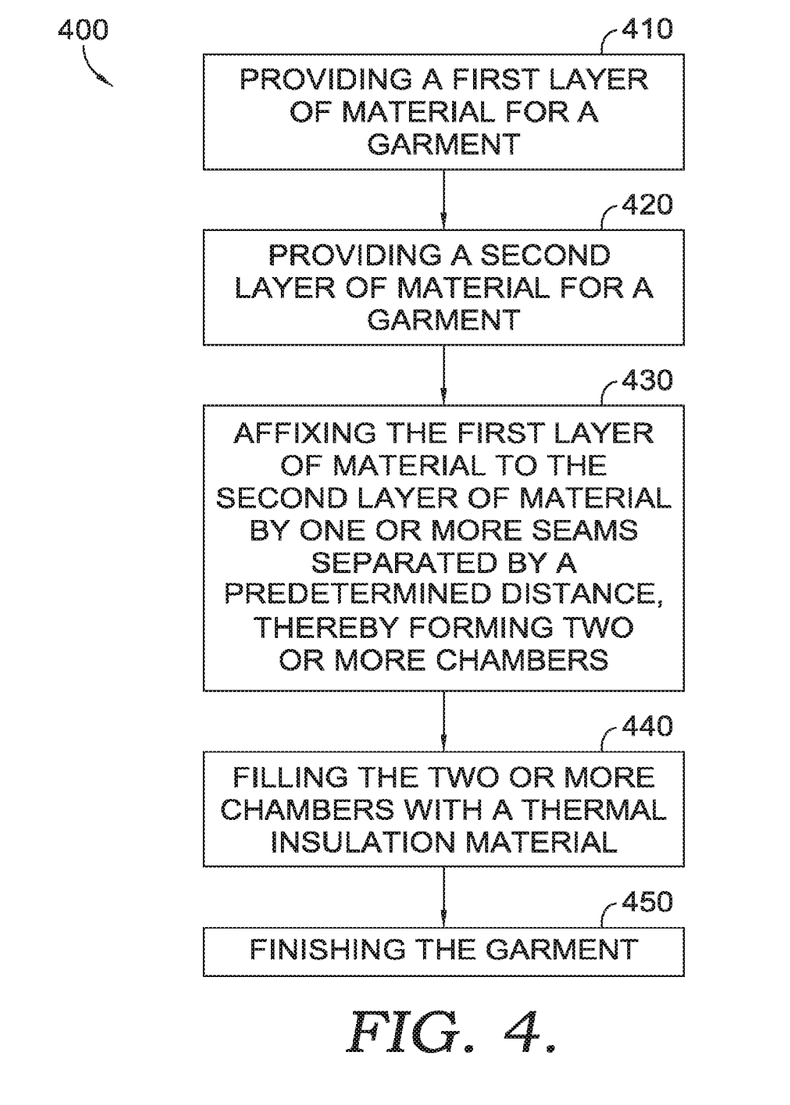
FIG. 4 depicts an exemplary method for manufacturing a thermally insulated garment in accordance with aspects of the present disclosure.

FIG. 4 depicts a flow chart of an exemplary method 400 for manufacturing a thermally-insulated garment in accordance with aspects of the present disclosure. The method comprises the steps of providing a first layer of material at step 410 and a second layer of material at step 420, where each of the first layer material and the second layer of material comprises an inner face and an outer face. The first and the second layers of material may be cut into the appropriate configurations for the particular garment configuration. Two or more chambers between the first layer of material and the second layer of material may be formed by forming one or more seams to affix the inner face of the first layer of material to the inner face of the second layer of material at step 430. Once the one or more chambers are formed, the chambers may be manually or mechanically filled with a thermally-insulating material comprising, for instance, a plurality of crimped thermally-reflective polymer strands, such as the thermally-reflective strand 100, at step 440. The thermally-reflective polymer strands may comprise Mylar®, or any other suitable material for thermal reflectivity in a garment. The chambers may further be filled with other types of natural or synthetic fill fibers. Additionally, the thermally-reflective polymer strands and/or the natural or synthetic fill fibers may be of a resilient material that is durable and resistant to deformation when subjected to multiple wash cycles. Once all the chambers are filled, the construction of the garment in accordance with the present invention may be completed at step 450.

As described above, the level of thermal insulation provided by the garments in accordance with the present invention may be adjusted by adjusting the parameters associated with each of the thermally-reflective strands (e.g., length, width, thickness, number, and/or degree of crimping). The parameters associated with each of the thermally-reflective strands may, for example, be adjusted to provide a greater or lesser amount of heat reflectivity. For instance, a greater amount of crimping and/or a greater number of the thermally-reflective strands may increase the surface area for reflectivity, while a lesser amount of crimping and/or a lesser number of the thermally-reflective strands may decrease the surface area for reflectivity.

Additionally, different areas of the garments in accordance with the present invention may be provided with different levels of thermal insulation. Furthermore, the parameters associated with the thermally-reflective strands may be adjusted depending upon which area of a garment the thermally-reflective strands will be located at. As an example, for those portions of the garment where a higher degree of insulation is needed, the number of thermally-reflective strands and/or the amount of crimping of the thermally-reflective strands may be increased to provide a greater degree of heat reflectivity. Conversely, if a high degree of insulation is not needed in a certain area of the garment, the number of thermally-reflective strands and/or the amount of crimping associated with the thermally-reflective strands may be reduced, or the thermally-reflective strands may not be provided in those areas.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A garment comprising:
   a first textile layer comprising a first inner face and a first outer face;
   a second textile layer comprising a second inner face and a second outer face, the first textile layer and the second textile layer positioned adjacent to each other to form a chamber therebetween; and
   a thermal layer contained within the chamber and comprising a plurality of discrete crimped thermally-reflective strands derived from a metalized molded polymer resin film, wherein each discrete crimped thermally-reflective strand comprises one or more of stitching, flocking, and protrusions, and wherein the plurality of discrete crimped thermally-reflective strands are interwoven or inter-knit into a sheet of the thermal layer.

2. The garment of claim 1, wherein the first inner face of the first textile layer and the second inner face of the second textile layer are in contact with the thermal layer, the first outer face of the first textile layer is exposed to an external environment, and the second outer face of the second textile layer is in contact with a wearer's body when the garment is worn.

3. The garment of claim 2, further comprising another chamber containing the thermal layer, wherein the chamber and the another chamber are separated by one or more seams.

4. The garment of claim 3, wherein the one or more seams are formed by stitching the first textile layer to the second textile layer.

5. The garment of claim 3, wherein the one or more seams are formed by adhesively bonding the first textile layer to the second textile layer.

6. The garment of claim 3, wherein the one or more seams are formed by adhesively bonding and stitching the first textile layer to the second textile layer.

7. The garment of claim 3, wherein the one or more seams are variably spaced from one another.

8. The garment of claim 1, wherein the plurality of discrete crimped thermally-reflective strands derived from the metalized molded polymer resin film comprise between 5-100 percent of the thermal layer.

9. The garment of claim 1, wherein the thermal layer comprises synthetic fiber fill material.

10. The garment of claim 1, wherein the thermal layer comprises a natural fill material, the natural fill material comprising one or more of down, cotton, hemp, and silk.

11. The garment of claim 1, wherein the each discrete crimped thermally-reflective strand derived from the metalized molded polymer resin film in the plurality of discrete crimped thermally-reflective strands of the metalized molded polymer resin Pilin comprises a length between 0.5 cm and 10 cm.

12. The garment of claim 1, wherein the each discrete crimped thermally-reflective strand of the plurality of discrete crimped thermally-reflective strands derived from the metalized molded polymer resin film comprise a thickness in a range of 0.01 cm to 0.3 cm.

13. The garment of claim 1, wherein the each discrete crimped thermally-reflective strand of the plurality of discrete crimped thermally-reflective strands derived from the metalized molded polymer resin film comprise a width in a range of 0.01 cm to 1 cm.

14. The garment of claim 1, wherein the each discrete crimped thermally-reflective strand of the plurality of discrete crimped thermally-reflective strands derived from the metalized molded polymer resin film comprise:
a length, a width, and a thickness.

15. The garment of claim 1, wherein the plurality of discrete crimped thermally-reflective strands comprise a random integration within the thermal layer.

16. A thermally-insulated garment comprising:
two or more chambers formed between a first textile layer of material and a second textile layer of material, wherein the two or more chambers are separated by one or more seams; and
a thermal layer comprising a thermally-insulating fill material and a plurality of discrete crimped thermally-reflective polymer strands contained within each of the two or more chambers, wherein the plurality of discrete crimped thermally-reflective polymer strands comprise a width in a range of 0.01 cm to 1 cm, wherein each discrete crimped thermally-reflective polymer strand in the plurality of discrete crimped thermally-reflective polymer strands comprises a frictional surface configured to grip to other discrete crimped thermally-reflective polymer strands and/or the thermally-insulating fill material, and wherein the plurality of discrete crimped thermally-reflective polymer strands are inter-woven or inter-knit into a sheet of the thermal layer.

17. The thermally-insulated garment of claim 16, wherein the frictional surface of the each discrete crimped thermally-reflective polymer strand of the plurality of discrete crimped thermally-reflective polymer strands comprises one or more of stitching, flocking, and protrusions.

18. The thermally-insulated garment of claim 16, wherein the plurality of discrete crimped thermally-reflective polymer strands comprise a length between 0.5 cm and 10 cm.

19. The thermally-insulated garment of claim 16, wherein the thermally-insulating fill material comprises a natural fill material, the natural fill material comprising one or more of do cotton, hemp, and silk.

20. The thermally-insulated garment of claim 16, wherein the thermally-insulating fill material comprises a synthetic fiber fill material.

21. A thermally-insulated garment comprising:
two or more chambers formed between a first textile layer of material and a second textile layer of material, wherein the two or more chambers are separated by one or more seams; and
a thermally-insulating fill material contained within each of the two or more chambers and comprising a fiber till material and a plurality of discrete crimped thermally-reflective polymer strands, wherein each discrete crimped thermally-reflective polymer strand of the plurality of discrete crimped thermally-reflective polymer strands comprise a length, a width, and a thickness, and wherein the plurality of discrete crimped thermally-reflective polymer strands are inter-woven or inter-knit into a sheet of the thermally-insulating fill material.

22. The thermally-insulated garment of claim 21, wherein the each discrete crimped thermally-reflective polymer strand of the plurality of discrete crimped thermally-reflective polymer strands further comprises one or more of stitching, flocking, and protrusions.

23. The thermally-insulated garment of claim 21, wherein the thickness is in a range of 0.01 cm to 0.3 cm, the width is in a range of 0.01 cm to 1 cm, and the length is in a range of 0.5 cm to 10 cm.

24. A method for manufacturing a thermally-insulated garment, the method comprising:
forming two or more chambers between a first textile layer of material and a second textile layer of material, wherein the first textile layer of material comprises a first inner face and a first outer face and the second textile layer of material comprises a second inner face and a second outer face, wherein the two or more chambers are formed by forming one or more seams to affix the first textile layer of material to the second textile layer of material; and
filling each of the two or more chambers with a thermal layer comprised of a thermally-insulating fill material and a plurality of discrete crimped thermally-reflective polymer strands derived from a metalized molded polymer resin film, wherein the each discrete crimped thermally-reflective strand further comprises one or more of stitching, flocking, and protrusions, and wherein the plurality of discrete crimped thermally-reflective polymer strands are inter-woven or inter-knit into a sheet of the there al layer.

25. The method of claim 24, wherein each of the plurality of discrete crimped thermally-reflective polymer strands derived from the metalized molded polymer resin film comprises:
a length, a width, and a thickness.

26. The method of claim 24, wherein the thermally-insulating fill material comprises one or more of synthetic fibers, down, and natural fibers.

27. The method of claim 25, wherein any of the plurality of discrete crimped thermally-reflective polymer strands derived from the metalized molded polymer resin film comprise the width in a range of 0.01 cm to 1 cm, wherein any of the plurality of discrete crimped thermally-reflective polymer strands derived from the metalized molded polymer resin film comprise the thickness in a range of 0.01 cm to 0.3 cm, and wherein any of the plurality of discrete crimped thermally-reflective polymer strands derived from the metalized molded polymer resin film comprise the length between 0.5 cm and 10 cm.

* * * * *

UNITED STATES PATENT AND TRADEMARK OFFICE
CERTIFICATE OF CORRECTION

PATENT NO. : 11,864,609 B2
APPLICATION NO. : 15/766073
DATED : January 9, 2024
INVENTOR(S) : David Turner It is certified that error appears in the above-identified patent and that said Letters Patent is hereby corrected as shown below:

In the Claims

- Column 10, Line 56, Claim 11, "Pilin comprises" should read --film comprises--.
- Column 11, Line 39, Claim 19, "do cotton," should read --down, cotton,--.
- Column 11, Line 49, Claim 21, "fiber till" should read --fiber fill--.
- Column 12, Line 34, Claim 24, "the there al laver." should read --the thermal layer.--.

Signed and Sealed this
Fourteenth Day of May, 2024

Katherine Kelly Vidal
*Director of the United States Patent and Trademark Office*